United States Patent

[11] 3,620,965

| [72] | Inventor | Edward J. Rosinski<br>Deptford, N.J. |
|------|----------|--------------------------------------|
| [21] | Appl. No. | 828,733 |
| [22] | Filed | May 28, 1969 |
| [45] | Patented | Nov. 16, 1971 |
| [73] | Assignee | Mobil Oil Corporation |

[54] EXPLOSIVE FRAGMENTATION OF POROUS SOLIDS
5 Claims, No Drawings

| [52] | U.S. Cl. | 208/120, 252/455 Z, 23/1 |
|------|----------|--------------------------|
| [51] | Int. Cl. | C10g 11/02 |
| [50] | Field of Search | 23/1, 1 E; 200/120, 455 |

[56] References Cited
UNITED STATES PATENTS

| 3,409,541 | 11/1968 | Flanders et al. | 208/120 |
| 2,435,760 | 10/1948 | Thacker et al. | 208/113 |
| 3,382,190 | 5/1968 | Wolff | 252/477 |

Primary Examiner—Delbert E. Gantz
Assistant Examiner—R. M. Bruskin
Attorneys—Oswald G. Hayes and Andrew L. Gaboriault ABSTRACT: Porous solids having surface area of at least 5 square meters per gram are reduced to smaller particle size by explosive fragmentation. Exemplary disclosure concerns aluminosilicate zeolites in extremely finely divided form prepared by detonation of crystalline zeolites having adsorbed therein explosive compounds and compositions. In one particular embodiment, finely divided zeolite catalyst is supplied to the reactants and energy is furnished to the system by detonation of explosive-loaded crystalline zeolites within the reaction mixture. In addition, the products of detonation may afford reactants.

EXPLOSIVE FRAGMENTATION OF POROUS SOLIDS

BACKGROUND OF THE INVENTION

1. Value of the Invention

An important property of porous solids employed as adsorbents, catalysts, catalyst supports and the like is diffusivity, i.e. the rate at which gases and liquids may diffuse into the pores for access to sorbent or catalytic surfaces. The limiting effect of diffusivity is mitigated by the use of smaller particles than have heretofore been available because of shorter diffusion paths over which the property is effective. Grinding to reduce particle size becomes extremely expensive below size of a few microns and produces irregularly shaped particles.

This invention is concerned with manufacture of porous solid particles in finely divided form by detonation of porous materials, of which crystalline zeolites are exemplary, the pores of which are loaded with explosive composition. More particularly, the invention provides highly efficient catalysts which avoid diffusion limitations and provide maximum availability of catalytic surfaces. In some cases, the invention can supply energy for endothermic catalytic reactions by a technique in which the explosive-loaded zeolite catalyst is detonated within the reaction mixture. The products of detonation can be the source of reactant substances such as oxides of carbon, nitrogen or both and may also apply desired high pressures for reactions favored by elevated pressure.

2. Description of the Prior Art

Zeolitic porous crystalline aluminosilicate has achieved wide recognition as a raw material in the manufacture of catalysts having unusual activity, selectivity and stability. A very large proportion of the cracking catalysts used in the United States and abroad is now constituted by highly active zeolites in combination with other substances which coact therewith to provide catalysts of unusually valuable properties.

The zeolitic catalysts have been described for a large number of reactions including cracking, hydrocracking, hydroforming, reforming, alkylation, isomerization, disproportionation, hydration of olefins, amination of olefins, oxidation, dehydrogenation, dehydration of alcohol, and desulfurization, among others. For many reactions the zeolite is activated by an ion exchange procedure which replaces the original cations, usually sodium, with other cations having stabilizing or activating functions or both. In some cases additional catalytic agents are incorporated within the internal pores or associated with the zeolites externally of the thermal absorption area. An important example is impregnation or combination of active zeolites with a hydrogenation-dehydrogenation catalyst for use in such reactions as hydrocracking. This invention contemplates utilization of these modifications, known to the prior art. An apt summary of the types of modifications which can be achieved by ion exchange and by combination with other catalytic agents is described in U.S. Pat. No. 3,140,252 granted July 11, 1964.

Although the newer crystalline zeolites have rapidly assumed prominence for catalytic, adsorbent and other utility of porous solids; the older, primarily amorphous adsorbents, catalysts and catalyst carriers are still of very great commercial importance. All classes of these materials have diffusivity limits which frequently must be considered in any proposed use. This is true of silica gel; alumina gel; mixed gels or precipitates such as silica-alumina, silica-thoria, silica-alumina-zirconia; adsorbent clays in either natural or acid-treated form; animal and vegetable chars and the like. On occasion these have been reduced in particle size, as by grinding. It has also been proposed to break down the size of lumps of such materials as hydrogels of silica, silica-alumina and the like by freezing before removal of the aqueous phase of the gel as formed.

A more recent development involves applying a crystallizable liquid to dehydrated porous solids; inducing crystallization of that liquid and then applying a second liquid which induces fragmentation of the particles which bear crystals of the first liquid within their pores. That technique is described in U.S. Pat. No. 3,383,056 granted May 14, 1968 to Leonard C. Drake.

SUMMARY OF THE INVENTION

This invention provides a unique measure of control over those properties of porous solids having influence on adsorptive and catalytic effectiveness which are related to the physical properties, primarily size and surface outside the pores of such solids used for catalysis or adsorption. By variation in the degree of loading with explosive compositions, zeolitic crystals and other porous solids may be fractured to almost any desired size, retaining catalytic, adsorptive, and chemical properties in each of the fragments. In many instances, the chemical, catalytic or adsorptive properties may be modified, generally advantageously. In some embodiments, certain properties become enhanced to such an extent that they become significant factors even though they may have been severely masked and unnoticed in the larger size particles.

It is an important aspect of the invention that the fragmented solids characterizing the product of the invention are essentially colloidal in dimension, or essentially micron to colloidal in size. In many instances their dimensions are detectable only by light scattering techniques.

In many catalytic reactions, it will be found desirable to accomplish detonation and shattering in the reaction mixture to be catalyzed by the final product. This is of significant advantage in such operations as cracking of hydrocarbon fluids in that the energy released by detonation supplies some, or all, of the endothermic heat of reaction.

The products of detonation also furnish some or all of the reactants. Also, detonation is competent to furnish some or all of the pressure which could promote interaction.

The freshly shattered product shows highly reactive sites at points of cleavage between atoms of the original particle, particularly in the crystalline zeolites where such cleavage is between atoms of the crystal lattice. These highly active sites can be caused to react with materials present in the medium in which detonation takes place to generate organo-inorganic compounds at the surface of the fractured solid. Means are thus provided which offer a possibility for manufacture of organic silicon and silicate compounds of high stability. For example, ethyl silicate compounds are useful as paint vehicles or paint binders.

DESCRIPTION OF SPECIFIC EMBODIMENTS

The process is advantageous in making available, generally without the use of grinding equipment, fluid-size particles, e.g., particles of such small size that they may be applied as a colloidally dispersed adsorbent or catalyst. The process is also useful for the preparation of various sols of diverse utility. Other advantages will become apparent from the ensuing description.

Considering the invention in greater detail, the porous material of which the granules are made may be of any chemical composition, organic or inorganic, and may have any utility. It is of course essential that the granules are porous in order that the explosive material may have access to the interior thereof. Specific solids include silica gel, alumina, silica-alumina, oxides of calcium, barium, nickel, iron, and the like. Gel-type solids are useful, as obtained by drying hydrated oxides such as alumina, silica, titania, zirconia, magnesia and zinc aluminate. Also the zeolites, both natural and synthetic, and including those zeolites which act as molecular sieves having pores of uniform and generally very small size, say about 4 to 15 Angstroms. Ion exchange forms of zeolites are suitable. Other solids are siliceous earths such as natural clays and claylike materials such as kaolin and montomorillonite clays, bentonite, fuller's earth, Superfiltrol, bauxite and Porocel; porous ceramic materials such as unglazed porcelain; aluminum silicate selective adsorbents such as calcium aluminum silicate; activated carbon, bone char, charcoal, graphite, hydrosilicates, particularly those of aluminum. In general, the solid is an inorganic material, this term being employed in a sense sufficiently broad to cover activated carbon, graphite, charcoal and bone chars which are essentially carbon, even though in some cases they may contain small amounts of hydrogen, oxygen, and other chemicals.

The preferred solids are inorganic, highly porous, and have a surface area greater than 15 square meters per gram. More generally, the surface area may vary from 5 square meter per gram to any desired upper limit; usually it may range from 5 to 700, and preferably from 50 to 300 or 400 square meters per gram. As is known, these high surface areas are the result of an internal effect, rather than merely the state of subdivision, and more particularly arise from the presence in the solids of numerous pores or micropores which may have diameters in the range of 3 moisture or 4 Angstroms to 100 microns, preferably 5 Angstroms to 2 or 3 microns. The pore volume is about 5 to 70 percent, preferably 10 to 50 percent, of the solids, and usually is greater than 0.2 cc. per gram. Microporous solids are preferred, the term "microporous" referring to porous, solid materials having at least 25 percent of the total pore volume comprising pores having diameters less than 100 Angstroms.

The preferred porous granules are crystalline zeolites such as zeolites X, Y, A; erionite faujasite and offretite. The invention is also applicable to porous solids in which the porosity or microporosity is developed therein by steps comprising controlled precipitation, gellation, drying, and calcining of inorganic hydrous oxides or mixtures of oxides. The hydrous gels resulting from the gellation step may contain foreign particulate matter dispersed therein in finely divided state. After drying and calcining, the gel granules will contain both micropores and macropores. It is found that in granules such as these the porosity tends to be more or less homogeneous. Less preferred are granules, such as compacted tablets or extruded pellets, formed by compressing finer granules, these materials lacking a structural homogeniety, and leading to less preferred results when treated according to the invention.

It is desirable that the granules be as free as possible from moisture. If moisture is present, it may be removed at the outset by heating the granules to a temperature in the range of 200 to 1,000° F., or higher, to drive absorbed and/or adsorbed water from the internal pores. Such heating may be done in conjunction with the application of reduced pressure to remove the moisture; or in place of reduced pressure, a flowing stream of inert gas may be employed to help remove the moisture; or the heating may be done in a stationary atmosphere.

The production of subdivided particles is favored if the starting solids are already in a partially subdivided form, i.e., are available as particles, by which is meant solid material having any suitable shape and having a size suitably in the range of $1\mu$ to 50 mm., nominal diameter, preferably $2\mu$ to 20 mm.

The degree of fragmentation is controllable by selection of an explosive with regard to rate of propagation of the explosive reaction and by control of amount of such explosive composition. Inert materials such as inorganic salts may be added to further control rate and violence of the explosion.

Generally, the explosive is impregnated into the pores from the liquid phase which may be the explosive itself or a solution thereof. It is generally desirable that the explosive be restricted to that inside the pores although amounts of explosive outside the pores are helpful in propagating the detonation when very small internal concentrations are employed.

Suitably the particles are brought in contact with the impregnating liquid, as by immersion, at a convenient temperature so that they imbibe the liquid until the pores are at least partially or completely filled. The immersion time is variable, but preferably is long enough to permit the particles and the liquid to reach an equilibrium. Then the particles are suitably separated from the excess liquid as by decantation, filtration, centrifugation, and the like. Alternately, the particles can be contacted with only the amount of liquid required to give the degree of loading. Prior to loading, these particles could be evacuated to facilitate easy access of the loading liquid to the internal pores of the solids.

The various types of catalysts adsorbents and the like derived from crystalline aluminosilicate zeolites have been widely described in recent patents and technical literature. These will not be reviewed in detail. Reference is made to Advances in Catalysis, Vol. 18, pages 259–371 by P. B. Venuto and P. S. Landis on Organic Catalysis over Crystalline Aluminosilicates.

According to the invention, such materials are loaded with an amount of explosive composition which will achieve a degree of fragmentation best-suited for each particular application. In general, the zeolites loaded with such explosive compositions are relatively stable, the zeolite serving for this purpose somewhat the same function as diatomaceous earth in dynamite. Nitroglycerin is a preferred explosive but the invention contemplates use of any material capable of explosive reactions such as nitrocellulose, trinitrotoluene, picric acid, ammonium nitrate, combinations of perchlorates, chlorates and nitrates with combustible materials such as carbon deposited in the pores by decomposition of hydrocarbons or carbohydrates.

The explosive composition may be loaded in the pores as such or may be formed by reaction in the pores as for example by absorbing glycerin, toluene, or olefins into the pores and nitrating the absorbed material by reaction with nitric acid or other suitable nitrating compounds.

Amounts of explosive composition as low as 1 percent of the zeolite may be employed where there is a need for fairly large fragments. For example, a rare earth acid X may be caused to adsorb as little as 1 percent weight of nitroglycerin which upon detonation by heat is fractured to a relatively minor extent for use in conventional catalysts such as that described in U.S. Pat. No. 3,140,253 granted July 11, 1964. If the fracturing is not too extensive, the parts will retain shape selective characteristics and be suitable for use in place of the type described in U.S. Pat. No. 3,140,322 granted July 11, 1964.

More extensive fragmentation results as the particles are loaded with explosive composition to greater proportion of their adsorption capability. Loading to at least 25 percent of the available capacity would be required for extensive fragmentation. When fractured so drastically, shape selective zeolite particles will tend to lose shape selective properties. Erionite for example, can be so fragmented that the parts will show full or nearly full catalytic effects with respect to molecules too large to penetrate normal erionite crystals.

When it is desired to utilize the energy of detonation for supply of heat of reaction or for vaporization of reactants, care is recommended to assure that detonation of one portion of catalyst supply does not detonate the reserve source, if any, for supply of explosive-loaded zeolite from which a portion of catalyst is supplied to the reaction. In general, detonation within a reaction is induced by heat. A portion of explosive-loaded zeolite is abruptly introduced to a mass of reactant within a confined zone. This is effectively achieved, for example, by projecting an encapsulated portion of explosive-loaded zeolite through an induction passage communicating with the reaction zone. Preferably, the encapsulating material has insulating properties to delay detonation for a suitable period after introduction.

In a hydrocarbon cracking reaction, the encapsulated material can advantageously be a high molecular weight, high melting point organic coating about the pellet of zeolite fines. The wax or other high molecular weight, high melting point coating can constitute a supply of additional reactant to the zone. As the coating melts and the pellet of introduced zeolite reaches detonation temperature, the individual zeolite crystals are fragmented and dispersed through the reaction zone by explosive forces. The energy released by explosion is absorbed by the oil reactant for the cracking reaction.

When it is desired to prepare the fragmented zeolite outside the reaction zone, the explosion is conducted within a suitable enclosure. For example, a supply of explosive-loaded zeolite is placed within a heavy walled plastic bag. Detonation can be accomplished by a high resistance wire to which current is supplied after the bag is closed or by any of the other means known to cause detonation of the particular explosive employed, for example, concussion.

Such prefractured zeolitic material may be introduced directly as a slurry in a reaction material by adding the finely divided catalyst particles to a reaction stream or to a stream of inert diluent added to the reactor. The finely powdered catalyst is also capable of dispersion in gaseous streams. For example, in reactions which employ hydrogen, the fine catalysts may be dispersed in the gaseous hydrogen supplied to the reactor. Depending upon the character of the reaction, the total products of explosion may be introduced to the reaction zone provided that the reaction products are either reactants or relatively inert. In general, the gaseous products of reactions will include water, oxides of nitrogen and oxides of carbon.

Alternately, the products of detonation can also furnish the necessary pressure in a sealed reactor to promote catalytic reaction with the catalytic fragments or they can be used to furnish the pressure to accelerate catalytic reaction between mixed components, such as oxidation, nitrating, fluoriding, etc.

Often, it will be found desirable to detonate the explosive-loaded porous solid in an inert liquid or in admixture with an inert solid which will melt or vaporize at the conditions of detonation thus absorbing at least part of the energy released by detonation through heat of vaporization, heat of fusion, or both of the inert materials. Use of such material which is in vapor phase after detonation simplifies separation because the fragmented solid may be settled and the vapor phase bled off at temperatures high enough to avoid reliquefaction.

The prefractured fine particles of zeolite may be composited in a matrix material according to the system described in U.S. Pat. No. 3,140,249 granted July 11, 1964. The finely fragmented material is advantageously collected by washing the explosion zone with water or other vehicle thus providing slurry of the prefractured zeolite for addition to matrix materials.

In some particular embodiments of the invention, specific catalytic materials can be prepared according to the following examples:

EXAMPLE 1

A crystalline aluminosilicate of the faujasite type having a silica-alumina ratio of 2.5 (commonly called Zeolite X) is exchanged with an aqueous solution of mixed rare earth chlorides at 180° F. until the sodium content of the zeolite is reduced to 0.5 weight percent, dry basis. The rare earth content calculated as oxide is 27.7 weight percent, dry basis. The rare earth exchanged zeolite (REX) is then washed free of soluble salts and dried in air at 230° F. The dried zeolite crystals are immersed in a saturated solution of nitroglycerin in ether, drained free of liquid and vacuum dried at room temperature to remove the solvent. One gram of the explosive-loaded zeolite is gently placed into a gelatin capsule which is then encapsulated by low melting point wax (120° F.).

One-hundred grams of Mid-Continent light gas oil is heated by an electric mantle while enclosed within a steel bomb of 1 liter capacity fitted with a vertical tube for introduction of the catalyst. The catalyst pellet encapsulated in the wax is placed in the upper end of the tube above a valve external to the bomb and the end of the tube is then closed by a threaded fitting. Upon opening of the valve below the catalyst pellet, the latter is dropped to the oil charge maintained at 800° F. The temperature and pressure rise sharply after the explosive is detonated. Upon cooling the bomb and removing the contents, it is found that extensive cracking has occurred to produce gasoline boiling range product.

EXAMPLE 2

A crystalline aluminosilicate of the faujasite type having a silica-alumina ratio 2.5 (commonly called zeolite X) is exchanged with an aqueous solution of mixed rare earth chlorides at 180° F. until the sodium content of the zeolite has been reduced to 0.5 weight percent dry basis. The rare earth content calculated as oxide was 27.7 weight percent dry basis. The rare earth exchanged zeolite (REX) is washed free of soluble salts and dried in air at 230° F. The dried zeolite crystals are heated to a temperature (above about 500° F.) sufficient to facilitate carbon deposits from a hydrocarbon stream. A stream of light gas oil is passed over the crystals to achieve the deposition of about 2 weight percent carbon. The sample is then cooled to room temperature and then saturated with a hot concentrated solution of potassium perchlorate. This perchlorate saturated faujasite is subsequently dried at low temperature. Two grams of the dried perchlorate containing carbonized faujasite is compacted into a capsule fitted with heating wires and then placed in a 10 gallon plastic bag container. Detonation is achieved by passing an electric current through the heating wires. The fragmented particles generated by the detonation are subsequently swept—10 minute period with nitrogen—into a reaction vessel containing a wide range Mid-Continent gas oil held at 900° F. Products of catalytic conversion taken overhead show a high degree of selective conversion of the gas oil to gasoline.

EXAMPLE 3

A crystalline aluminosilicate of the natural erionite type is first dehydrated at 1,000° F., then cooled to room temperature and contacted with an alcoholic solution of nitroglycerin. The excess solution is withdrawn from the natural crystalline aluminosilicate followed by low temperature drying under vacuum. This dried nitroglycerin-containing natural crystalline aluminosilicate is used in the process for converting hydrocarbons as described in example 1.

GLOSSARY

As used herein the following terms have the meanings set opposite them. These definitions are copied from Webster's Third New International Dictionary of the English Language Unabridged, G. & C. Merriam Co., Springfield, Mass. (1961).

Explosive—an explosive substance: a substance that on ignition by heat, impact, friction, or detonation undergoes very rapid decomposition (as combustion) with the production of heat and the formation of more stable products (as gases) which exert tremendous pressure as they expand at the high temperature produced; esp: a solid chemical compound or mixture of compounds that is used to release energy for performing work (as in blasting or propelling projectiles).

Fusible—capable of being fused; esp: capable of being liquefied by heat.

Reactant—a chemically reacting substance.

I claim:

1. A method for conducting an endothermic reaction of reactant substance in the presence of a porous solid catalyst capable of promoting said reaction with dispersion of finely divided porous solid catalyst of low limitation by diffusivity through the reaction mixture and concurrent supply of energy compensating at least in part for the energy demand of the said endothermic reaction; said method being characterized by introduction to the reactant substance of particles of said porous solid catalyst bearing an explosive composition within the pores thereof and detonating said explosive composition.

2. The method of claim 1 wherein the porous solid impregnated with explosive composition is detonated by heat of the reactant substance and is introduced thereto within a capsule of a solid substance fusible at the temperature of the reactant substance.

3. The method of claim 1 wherein the porous solid is a crystalline aluminosilicate zeolite.

4. The method of claim 3 wherein the zeolite bears rare earth cations introduced thereto by ion exchange.

5. The method of claim 1 wherein the reactant substance is a petroleum fraction and the reaction is cracking which is conducted at catalytic cracking conditions of temperature and pressure and which is induced by rare earth zeolite as catalyst.

* * * * *